United States Patent
Blake et al.

(10) Patent No.: US 8,131,937 B2
(45) Date of Patent: Mar. 6, 2012

(54) APPARATUS AND METHOD FOR IMPROVED DATA PERSISTENCE WITHIN A MULTI-NODE SYSTEM

(75) Inventors: Michael A. Blake, Wappingers Falls, NY (US); Harmony L. Helterhoff, Austin, TX (US); Arthur J. O'Neill, Wappingers Falls, NY (US); Vesselina K. Papazova, Highland, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/766,977

(22) Filed: Jun. 22, 2007

(65) Prior Publication Data

US 2008/0320226 A1 Dec. 25, 2008

(51) Int. Cl.
*G06F 13/00* (2006.01)

(52) U.S. Cl. ............... 711/133; 711/E12.055

(58) Field of Classification Search ........... 711/130–133
See application file for complete search history.

(56) References Cited

U.S. PATENT DOCUMENTS

| | | | |
|---|---|---|---|
| 6,338,124 B1 | 1/2002 | Arimilli et al. | |
| 6,349,367 B1 | 2/2002 | Arimilli et al. | |
| 6,434,672 B1 * | 8/2002 | Gaither | 711/130 |
| 6,449,671 B1 * | 9/2002 | Patkar et al. | 710/107 |
| 2003/0005232 A1 * | 1/2003 | Guthrie et al. | 711/135 |
| 2003/0009643 A1 * | 1/2003 | Arimilli et al. | 711/155 |
| 2003/0154346 A1 * | 8/2003 | Gruner et al. | 711/130 |
| 2006/0143384 A1 * | 6/2006 | Hughes et al. | 711/130 |
| 2006/0224829 A1 * | 10/2006 | Evrard et al. | 711/133 |
| 2007/0156963 A1 * | 7/2007 | Chen et al. | 711/130 |
| 2007/0239938 A1 * | 10/2007 | Pong | 711/122 |
| 2007/0260819 A1 * | 11/2007 | Gao et al. | 711/138 |
| 2008/0022049 A1 * | 1/2008 | Hughes et al. | 711/130 |
| 2008/0040555 A1 * | 2/2008 | Iyer et al. | 711/133 |
| 2008/0276045 A1 * | 11/2008 | Kulkarni et al. | 711/125 |
| 2010/0153650 A1 * | 6/2010 | Guthrie et al. | 711/133 |

* cited by examiner

*Primary Examiner* — Pierre-Michel Bataille
*Assistant Examiner* — Sean D Rossiter
(74) *Attorney, Agent, or Firm* — Cantor Colburn LLP; John Campbell

(57) ABSTRACT

Improved access to retained data useful to a system is accomplished by managing data flow through cache associated with the processor(s) of a multi-node system. A data management facility operable with the processors and memory array directs the flow of data from the processors to the memory array by determining the path along which data evicted from a level of cache close to one of the processors is to return to a main memory and directing evicted data to be stored, if possible, in a horizontally associated cache.

20 Claims, 3 Drawing Sheets

APPARATUS AND METHOD FOR IMPROVED DATA PERSISTENCE WITHIN A MULTI-NODE SYSTEM

FIELD AND BACKGROUND OF INVENTION

This invention relates to computer systems and their operation and particularly to data persistence within a multi-node system.

Historically, data persistence within a multi-node computer system has been a focus of computer system architecture inasmuch as it avoids stalling of processor requests and the negative impact such stalling may have on overall system performance. As here used, reference to a node means an organization of one or more processors and a memory array operatively associated with the processor(s) which has main memory and one or more levels of cache interposed between the processor(s) and the main memory. Reference to a multi-node system, then means an organization of a plurality of nodes.

Algorithms and design methods intended to minimize and avoid stalling typically have taken only a few forms. The most straight forward of these is an increase in the number and size of cache(s) within a system. In this approach, data persistence is addressed through an overall increase in cache space and improves through the simple increase in the number of lines which can be stored in cache and the length of their tenure in a given cache.

Another approach has been through improved cache line replacement algorithms, which work under the premise that a more intelligent selection of cache lines for eviction, when a new line install is required, will result in the persistence of the most relevant data. The assumption is that a subsequent fetch is more likely to encounter a hit in the remaining lines of code instead of the evicted lines.

Yet another approach is by way of pre-fetch algorithms, which do not directly address data persistence by definition, but instead seek to predict lines of future importance and bring them toward the processor(s) in a timely manner.

With all of these approaches, the technologies generally do well in address the issue of data persistence in various forms. However, they have consistently been focused on what is here described as the vertical aspect of a cache structure. While this characterization will be expanded on in the discussion which follows, it can here be noted that the vertical aspect describes the data path to or from a processor or processor complex through associated levels of cache directly associated with that processor or processor complex and from or to a main memory element directly associated with that processor or processor complex.

What is described here as the present invention focuses more on horizontal aspects of cache design, particularly in a multi-node system.

SUMMARY OF THE INVENTION

With the foregoing in mind, it is a purpose of this invention to improve access to retained data useful to a system by managing data flow through cache associated with the processor(s) of a multi-node system. In particular, the management of data flow takes advantage of the horizontal relationship among cache associated with the plurality of processor. In realizing this purpose, a data management facility operable with the processors and memory array directs the flow of data from the processors to the memory array by determining the path along which data evicted from a level of cache close to one of the processors is to return to a main memory and directing evicted data to be stored, if possible, in a horizontally associated cache.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

White the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
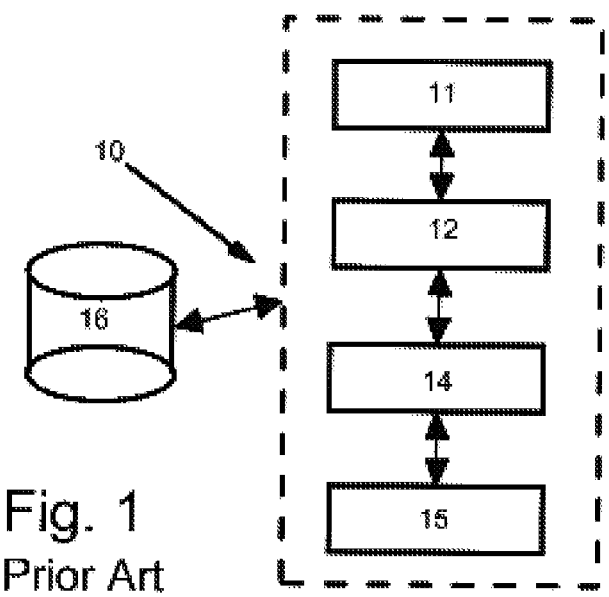
FIG. 1 is a representation of prior art arrangements of a processor or processor complex, level one and level two (L1 and L2) cache, and main storage or memory.

Referring now to FIG. 1, what is there shown is one traditional system 10, having a processor 11, L1 cache 12, L2 cache 14, main storage or memory 15, and a link to Input/Output (I/O) 16. Observing this simple system with multiple levels of cache, it can be seen that the memory array composed of the cache 12, 14 and main memory 15 form a vertical structure, typically with smaller cache 12 closer to the processor 11 and consistently larger capacity cache 14 as data moves toward the main storage 15. While two levels of cache are here shown, it will be understood by persons of skill in the applicable arts that varying numbers of levels of cache may be provided with varying organizations. It is contemplated that the invention to be here described will find usefulness in just such a wide variety or organizations, once the data management technique which has been invent is understood. As data within this type of system is aged out or displaced from a given level of cache, due to more recent cache fetches requiring storage space in an upper level of cache, lines of code are moved from L1 to L2 to main memory as an eviction process completes.

Figure 2:
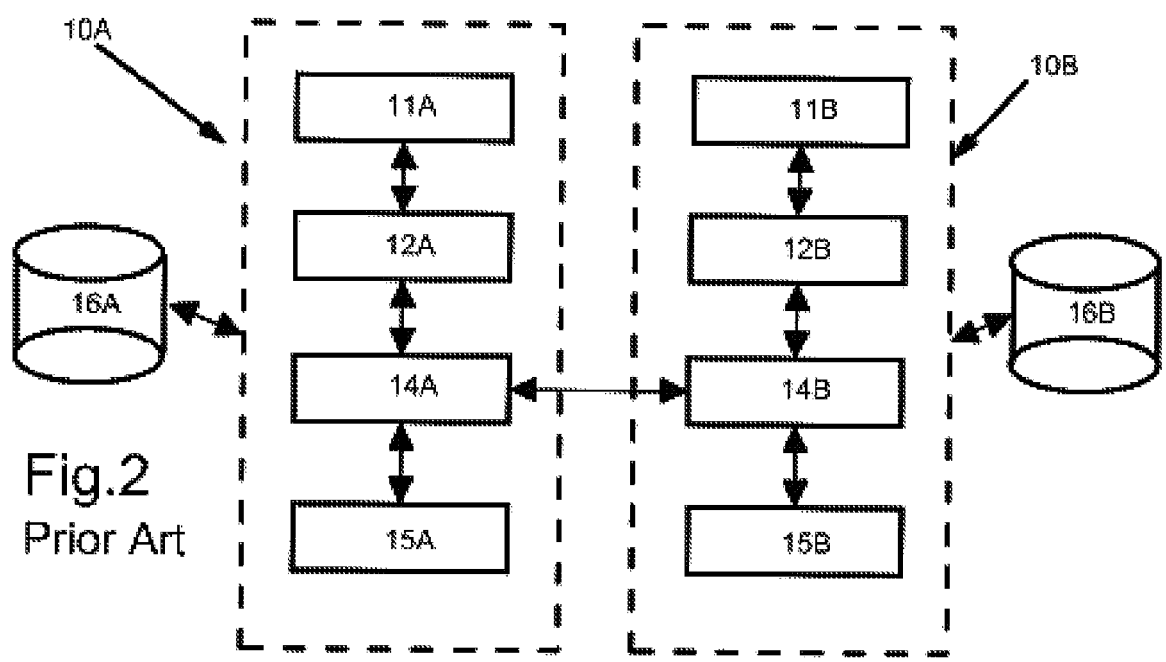
FIG. 2 is a representation of prior arrangements of a multi-node system having elements similar to FIG. 1 and a horizontal association between L2 cache.
Figure 3:
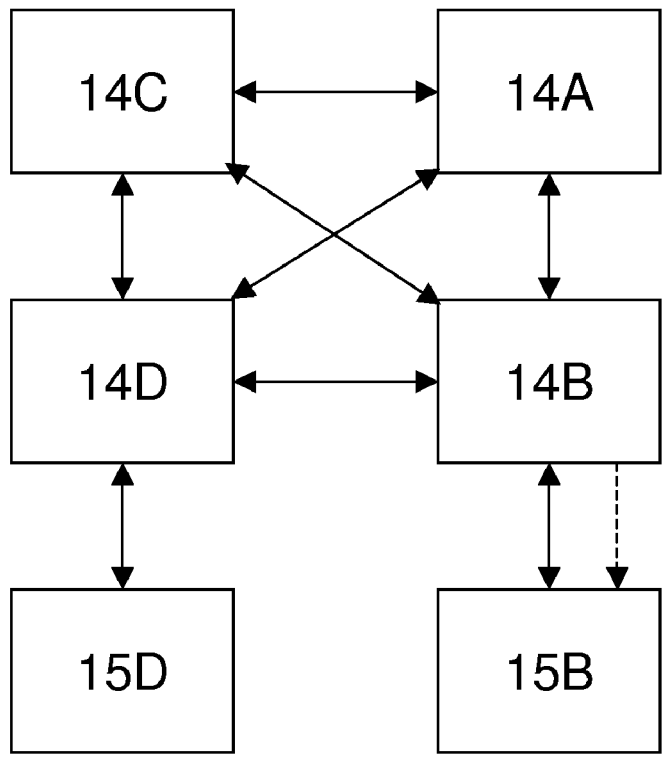
FIG. 3 is a representation of prior art data flow for evicted lines returned to main memory in a multi-node system similar to FIG. 2.

FIG. 2 illustrates a system having multiple nodes in which there exists a second similar vertical memory array with cache and main memory. Here, similar reference characters are used with the addition of letters to indicate the differing nodes. That is, nodes 10A and 10B each have a processor or processor complex 11A and 11B, Cache 12A; 12B; 14A and 14B and main memory 15A and 15B. What differs from the system of FIG. 1 is that a horizontal link exists between the L2 cache 14A and 14B. In data management facilities operating in such an environment heretofore, data evicted form an L1 cache such as the cache 12A passes to the associated L2 cache 14A and then to an associated main memory. The interconnected cache 14A and 14B are shared cache in the system. This data flow is here characterized as a vertical flow and is indicated in FIG. 3 (in which the L2 cache of four nodes and the main storage associated with two of those cache are shown while the processors and L1 cache are omitted for clarity) with a dotted line. A data line evicted from L2 cache 14A will pass directly through L2 cache 14B to main storage 15B.

In FIG. 3, the L2 cache 14A, 14B, 14C and 14D of four linked processors are shown as is the main storage for two of those processors, 15B and 15D. While not here shown, it will be understood that the associated elements shown for example in FIGS. 1 and 2 will be present in the system illustrated in FIGS. 3 and 4 and absent from the figures solely for the purposes of simplifying what is shown. The data path on eviction of a line from the lowest level of shared cache (L2) passes directly to the relevant main storage (from 14B to 15B).

The problem which arises with such data flow comes from the latency incurred in reaching each level of cache or memory. As a result, a typical processor fetch from L1 cache may incur a penalty of, for example, X, while a fetch from a corresponding L2 cache may incur a penalty of 3X and from main memory a penalty of 24X.

It is in attempts to address this latency problem that numerous schemes have been devised to improve caching algorithms and data flow management facilities, such that the lines selected for eviction are better chosen for a given system design and workload. For the same reasons, pre-fetch algorithms and data flow management have been devised in hardware and software in attempts to pre-empt a processor request for a given line such that the exponential effect of cache latency penalties can be avoids or diminished. Such schemes require the addition of large amounts of hardware and/or software support to provide any measurable gain.

Figure 4:
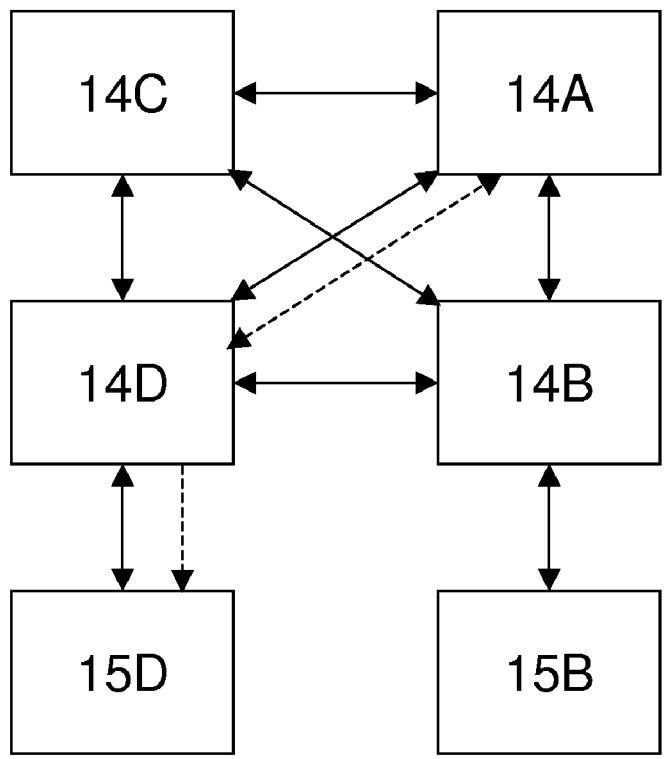
FIG. 4 is a representation of data flow for evicted lines returned from a processor in a multi-node system and in accordance with this invention.

Rather than addressing pre-fetching or improved line selection for cache replacement at the time of a fetch, this invention attends to the route taken by data at the time of eviction and routes that can be taken to assist in persistence of the data where appropriate. Referring now to FIG. 4, which is identical in many respects to FIG. 3, it is contemplated that data evicted from a cache towards main memory, while it could follow the traditional flow from a given L1/L2 cache to a locally attached main memory, may also take, in accordance with this invention, a flow from one L2 cache to another L2 cache through the horizontal connection there between. More specifically, in accordance with this invention, a data management facility is operable with the processors and memory array for directing the flow of data from the main memories to the processors and, when data is to be cached and later evicted, from the processors to the memory array. The data management facility determines the path along which data evicted from a level of cache close to one of the processors is to return to a main memory and proceeds through a sequence, of "if . . . then" decision points. If the path of data to be evicted is determined to pas through a shared cache associated with another processor, then it is determined whether the last named shared cache has a compartment capable of receiving the data being evicted. If so, that is the last named shared cache is determined to have available a compartment capable of receiving the data being evicted, then the data being evicted is stored in that available compartment.

More particularly, the data line being evicted from L1 cache 12A to L2 Cache 14A and passing to eventual main storage 15D will pass through L2 cache 14B and be stored there if it is determined that that L2 cache 14B has a compartment capable of receiving the data being evicted. It is a two stage "if . . . then" determination: dos the path pass through another L2 cache; and does that L2 cache have capacity.

While past design implementations have extended the single-node line eviction path to a multi-node system with little or no improvement, this invention improves the process by actively scanning the cache of a remote node, through the horizontal association, for empty/invalid compartments where the evicted line from another node can be installed, if the line has to traverse through this cache on its way to its respective main memory or storage. This allows the evicted line to persist longer than is allowed in prior art implementations. This invention increases the potential for a subsequent fetch to find a line existing within a higher level of cache in the system, as compared to the traditional approach which would have displaced the data back to main memory.

It is contemplated that this invention may be implemented in a variety of ways in apparatus, in methods and in program code originated and made available to computer systems configured as multi-node system as have been here described.

Figure 5:
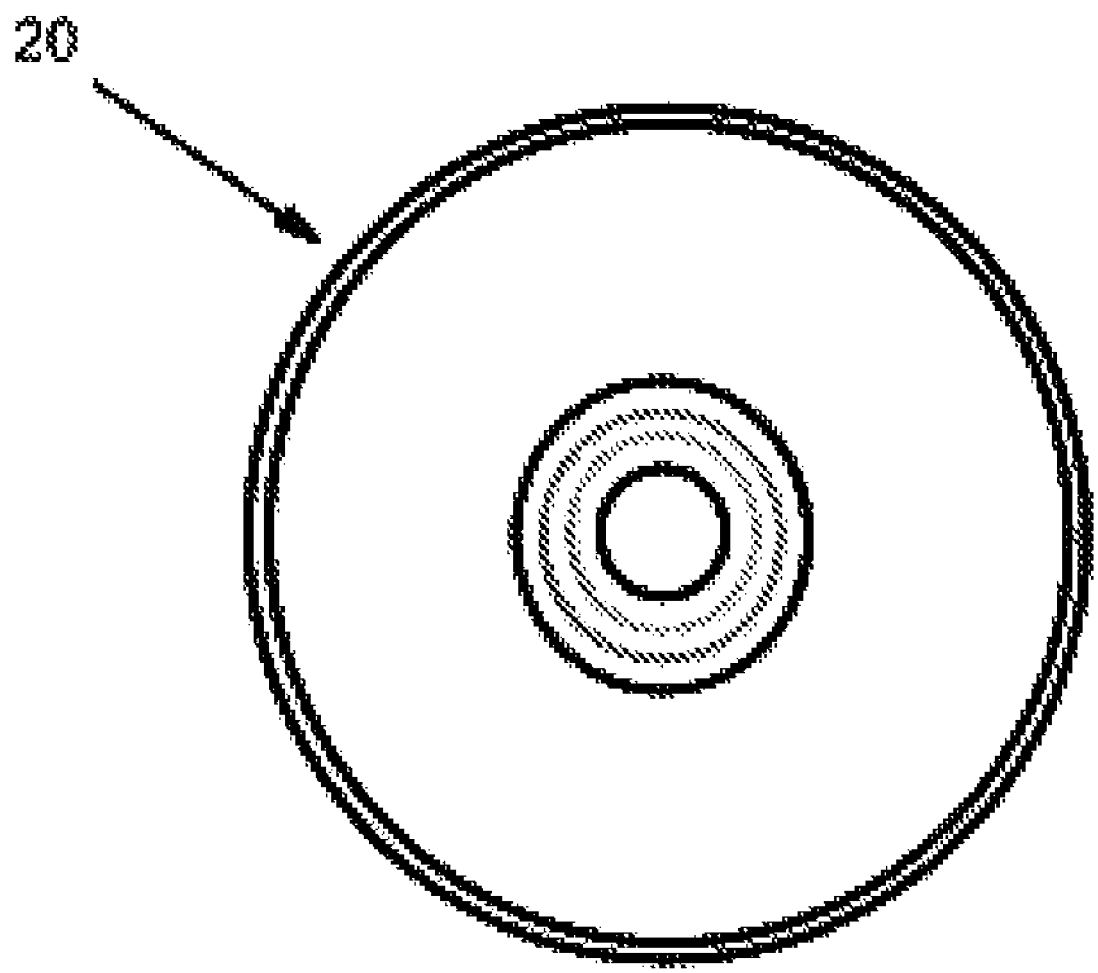
FIG. 5 is a representation of a computer readable medium on which is stored instructions implementing the methods of this invention.

FIG. 5 shows a computer readable medium, in the form of an optical disk 20, which carries computer executable code stored on the media accessibly to and executable on a computer system for implementing this invention. While here shown for purposes of illustration it will be appreciated that the media may be an optical disk, a magnetic disk, a signal passed to the system or some other form known to those of skill in the art. What is significant is that the appropriate instructions are produced and then provided to be deployed to and executed on a computer system which has a plurality of priority setting logic elements which controllably pass requests for access to computer system resources to a shared pipeline as contemplated here.

In the drawings and specifications there has been set forth a preferred embodiment of the invention and, although specific terms are used, the description thus given uses terminology in a generic and descriptive sense only and not for purpose of limitation.

What is claimed is:

1. An apparatus comprising:
a plurality of processors;
a plurality of cross-coupled caches of a level of cache memories;
main memories, each of said main memories associated with a corresponding processor and the level of cache memories shared among said processors; and
a data management facility operable with said processors for directing the flow of data from said main memories to said processors and from said processors to said level of cache memories, the apparatus configured to perform:
determining a path along which data evicted from a first cross-coupled cache is to return to a main memory; and
determining whether a last passed through cross-coupled cache has an empty or invalid compartment for receiving the data being evicted in response to determining that the path passes through a cross-coupled cache associated with another processor; and
storing the data being evicted in an available compartment in response to determining that the last passed through cross-coupled cache has at least one empty or invalid compartment for receiving the data being evicted.

2. Apparatus according to claim 1 wherein said level of cache memories comprises a plurality of levels of cache memories associated vertically with a corresponding processor, one of said levels of cache memories being said level which is shared among said processors.

3. Apparatus according to claim 2 wherein said level of cache memories has greater storage capacity in levels of cache memories associated more closely to said main memories than to said processors.

4. Apparatus according to claim 2 wherein one or more of said level of cache memories which is the shared level is associated more closely to said main memories than to said processors.

5. Apparatus according to claim 1 wherein said level of cache memories comprises a level one cache memory and a level two cache memory associated with each of said processors and further wherein said level two cache memories are the cache memories shared among said processors, said data management facility directing data evicted from a level one cache memory associated with a first processor to a level two cache memory associated with a second processor if the conditions for such transfer are met.

6. Apparatus according to claim 5 wherein said level two cache memories have a greater storage capacity than do said level one cache memories.

7. Apparatus according to claim 5 wherein said level one cache memories are linked vertically to corresponding processors and further wherein said level two cache memories are linked non-vertically one to another.

8. A method comprising:
organizing a main memory associated with one of a plurality of processors and a plurality of cross-coupled caches of a level of cache memories shared among the processors; and
processing data transfers from a processor toward a main memory by:
determining a path along which data evicted from a first cross-coupled cache is to return to a main memory;
determining whether a last passed through cross-couple cache has an empty or invalid compartment for receiving the data being evicted in response to determining that the path passes through a cross-coupled cache associated with another processor; and
storing the data being evicted in that available compartment in response to determining that the last passed through cross-coupled cache has at least one empty or invalid compartment for receiving the data being evicted.

9. Method according to claim 8 wherein the organizing of the level of cache memories comprises establishing a plurality of levels of cache memories associated vertically with a corresponding processor, one of said levels of cache memories being said level which is shared among said processors.

10. Method according to claim 9 wherein the organizing of the level of cache memories provides greater storage capacity in levels of cache memories associated more closely to said main memories than to said processors.

11. Method according to claim 9 wherein the level of cache memories which is the shared level is associated more closely to the main memories than to the processors.

12. Method according to claim 8 wherein the organization of the level of cache memories comprises a level one cache memory and a level two cache memory associated with each of said processors and further wherein the level two cache memories are the cache memories shared among said processors, and further wherein the processing of data transfers comprises directing data evicted from a level one cache memory associated with a first processor to a level two cache memory associated with a second processor if the conditions for such transfer are met.

13. Method according to claim 12 wherein said level two cache memories have a greater storage capacity than do said level one cache memories.

14. Method according to claim 12 wherein said level one cache memories are linked vertically to corresponding processors and further wherein said level two cache memories are linked non-vertically one to another.

15. A computer program product comprising:
a tangible non-transitory computer readable storage medium readable by a processing circuit and storing instructions for execution by the processing circuit for performing a method comprising:
processing data transfers from a processor toward a plurality of main memories each of the main memories associated with a corresponding one of a plurality of processors and a plurality of cross-coupled caches of a level of cache memories each associated with a corresponding one processor and with others of the cross-coupled cache memories;
determining a path along which data evicted from a first cross-coupled cache is to return to a main memory;
determining whether a last passed through cross-coupled cache has an empty or invalid compartment for receiving the data being evicted in response to determining that the path passes through a cross-coupled cache associated with another processor; and
storing the data being evicted in that available compartment in response to determining that the last passed through cross-coupled cache has at least one empty or invalid compartment for receiving the data being evicted.

16. Method according to claim 15 wherein the level of cache memories is organized to have a plurality of levels of cache memories associated vertically with a corresponding processor, one of said levels of cache memories being the level at which the cache memories are associated one with another.

17. Method according to claim 16 wherein the level of cache memories is organized to provide greater storage capacity in levels of cache memories associated more closely to said main memories than to said processors.

18. Method according to claim 16 wherein the level of cache memories which is the shared level is associated more closely to the main memories than to the processors.

19. Method according to claim 15 wherein the level of cache memories is organized to have a level one cache memory and a level two cache memory associated with each of said processors and further wherein the level two cache memories are the cache memories shared among said processors, and further wherein the processing of data transfers comprises directing data evicted from a level one cache memory associated with a first processor to a level two cache memory associated with a second processor if the conditions for such transfer are met.

20. Method according to claim 19 wherein the method is embodied in a series of instructions provided on a tangible computer readable medium.

* * * * *